United States Patent [19]

Saito

[11] Patent Number: 4,747,558

[45] Date of Patent: May 31, 1988

[54] FISHING REEL

[75] Inventor: Masaji Saito, Tokyo, Japan

[73] Assignee: Daiwa Seiko Inc., Tokyo, Japan

[21] Appl. No.: 10,301

[22] Filed: Feb. 2, 1987

[30] Foreign Application Priority Data

Mar. 13, 1986 [JP] Japan .................................. 61-55928

[51] Int. Cl.$^4$ ...................... A01K 89/00; A01K 89/02
[52] U.S. Cl. ........................... 242/84.5 A; 242/84.1 R;
242/84.5 R; 242/84.51 A
[58] Field of Search ...................... 242/84.1 R, 84.2 G,
242/84.5 A, 84.5 P, 84.5 R, 84.51 A

[56] References Cited

U.S. PATENT DOCUMENTS

| | | | |
|---|---|---|---|
| 2,400,317 | 5/1946 | Reynolds | 242/84.1 R |
| 2,863,617 | 12/1958 | Chapin et al. | 242/84.5 P |
| 4,238,085 | 12/1980 | Jansson et al. | 242/84.2 G |
| 4,488,689 | 12/1984 | Councilman | 242/84.5 P |
| 4,513,925 | 4/1985 | Yamaguchi | 242/84.5 P |
| 4,545,545 | 10/1985 | Councilman | 242/84.5 P |
| 4,555,072 | 11/1985 | Hitomi | |

*Primary Examiner*—John Petrakes
*Attorney, Agent, or Firm*—Browdy & Neimark

[57] ABSTRACT

A fishing spinning reel consisting of a rear-end-walled cylinder projecting from the rear portion of a reel casing, a spool shaft which is supported on the rear portion of the reel casing so that it can be turned and axially slid, and which is extended at the rear end portion thereof into the cylinder, a spool shaft-braking drag braking member mounted on the spool shaft in the cylinder, an operating cylinder supported rotatably on the end-walled portion of the end-walled cylinder and formed so as to surround the end-walled cylinder, a rotatable member fitted in the supported portion in the end-walled cylinder of the operating cylinder and adapted to be turned with this supported portion, and a movable regulating member contacting the rear portion of the drag braking member and engaged with the rotatable member so that the regulating member can be moved only in the axial direction of the spool shaft. Owing to the end-walled cylinder, the entry of seawater and sand thereinto can be prevented, so that the operating cylinder and drag means function reliably. Since the movably regulating member is provided, a drag braking operation can be carried out by a small tightening torque of the operating cylinder. The reel casing can be made compact owing to this operating cylinder which does not move back itself.

4 Claims, 4 Drawing Sheets

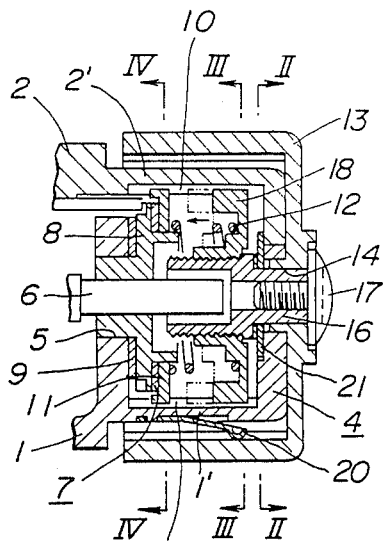
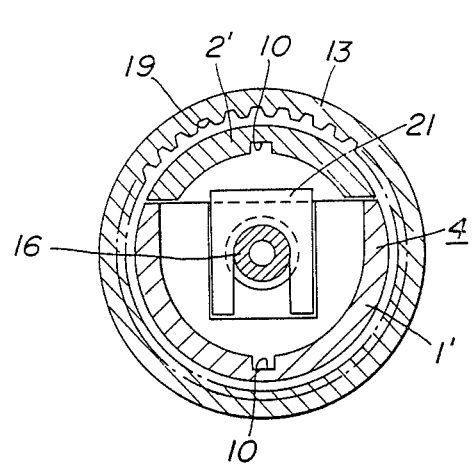
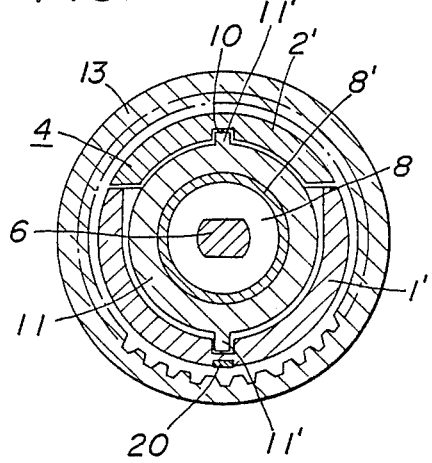

FISHING REEL

BACKGROUND OF THE INVENTION

1. Field of the Invention

This invention relates to an improvement in a drag unit in a fishing spinning reel, which enables an operating handle to be turned lightly and smoothly, whereby the operation efficiency of the spinning reel can be improved, and the length of the portion of the spinning reel which projects backward from a reel casing can be minimized, whereby the spinning reel can be miniaturized.

2. Description of the Prior Art

The so-called rear drag system in a fishing spinning reel, in which a drag means for a spool shaft is provided in a rear portion of a reel casing, is known from, for example, the specification of U.S. Pat. No. 4,555,072. In all of the prior art rear drag systems, a regulating cylinder, which consists of a cylindrical operating handle combined unitarily with a cylindrical portion projecting from the rear section of a reel casing, is screwed with this rear section so that the regulating cylinder can be axially moved, and the spool braking force is regulated by pressing a drag braking member for a spool shaft by the regulating cylinder.

However, in such a rear drag system, a difference between the diameter of the cylindrical operating handle and that of the screwed portion of the regulating cylinder is small, so that a large force is required to tighten the cylindrical operating handle. Consequently, the regulating of the cylindrical operating handle cannot be done lightly and smoothly, i.e., the efficiency in operating this regulating handle is low. Moreover, seawater and sand are apt to enter the screwed portion of the regulating cylinder to prevent the turning of the cylindrical operating handle. Since the cylindrical operating handle is axially moved, the length of the portion of the spinning reel which projects from the reel casing when the cylindrical operating handle is moved back becomes large accordingly. Therefore, the reel casing cannot be miniaturized.

SUMMARY OF THE INVENTION

An object of the present invention is to provide a fishing spinning reel having a smoothly-movable operating handle, and a greatly-reduced length of the portion of the spinning reel which projects backward from a reel casing.

The first characteristics of the present invention reside in a rear drag system in such a fishing spinning reel, in which the cylindrical portion provided at the rear section of a reel casing consists of a cylindrical rear-end-walled member so as to prevent extraneous matter, such as seawater and sand, from entering the cylindrical member, and troubles from occurring in an operating cylinder-turning operation and a drag means.

The second characteristics of the present invention reside in a fishing spinning reel, in which a difference between the diameter of an operating cylinder, which is adapted to be turned on the outer side of a cylindrical end-walled member, and that of the engaged portions of a movable regulating member, which is adapted to urge a drag braking member, and a rotatable member, which is provided in the central portion of the operating cylinder, can be set to a higher level to thereby enable a drag braking operation to be carried out easily by a small turn-tightening torque, the operating cylinder being turned in a predetermined position in the cylindrical end-walled member and not moving itself so as to project backward from the rear side of a reel casing, so that the length of the reel casing in the direction of a spool shaft can be reduced.

The third characteristics of the present invention reside in a fishing spinning reel, in which a movable regulating member adapted to urge a drag braking member in a cylindrical end-walled member is engaged with a rotatable member by a screw member so as to be axially moved, so that it becomes possible to minimize the diameter of the engaged portions of the movable regulating member and rotatable member, and the pitch of the screw member without being influenced by the standards, accuracy and strength of the screw member, widen the range of regulation of the level of the drag braking force, operate a drag unit finely, and practice a wide-range fishing operation.

The above and other objects as well as advantageous features of the invention will become apparent from the following description of the preferred embodiments taken in conjunction with the accompanying drawings.

BRIEF DESCRIPTION OF THE DRAWINGS

FIG. 2 is a sectional view taken along the line I—I in FIG. 1;

FIG. 3 is a sectional view taken along the line II—II in FIG. 2;

FIG. 4 is a sectional view taken along the line III—III in FIG. 2;

FIG. 5 is a sectional view taken along the line IV—IV in FIG. 2;

DESCRIPTION OF THE PREFERRED EMBODIMENTS

Figure 1:
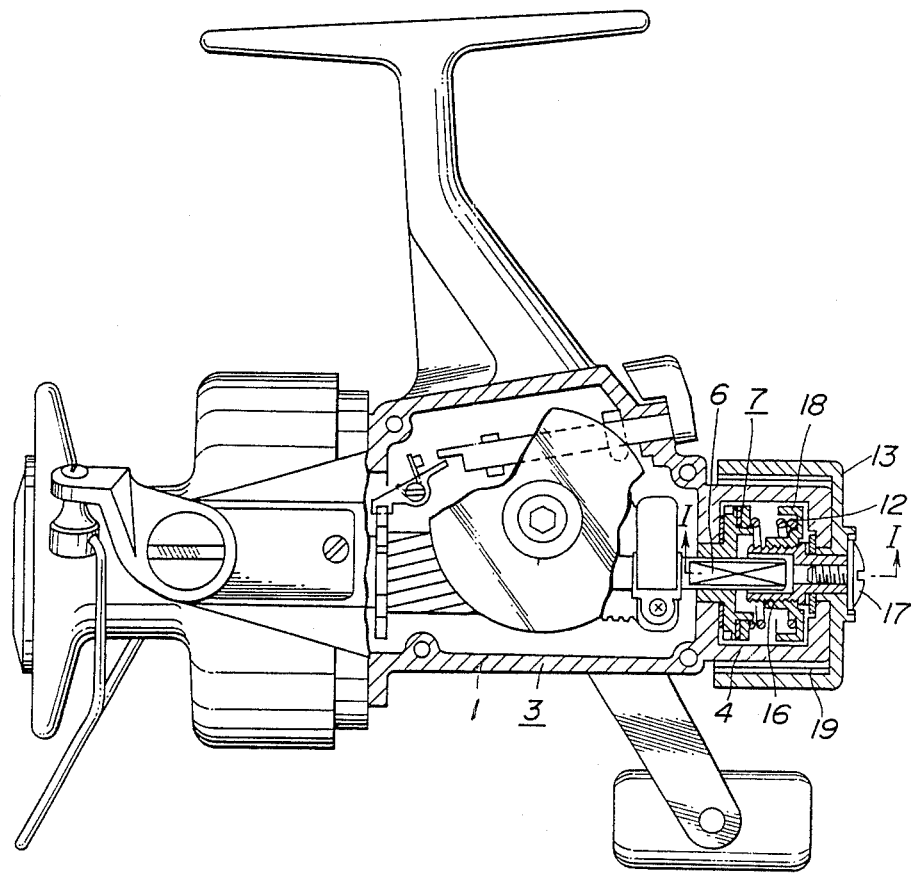
FIG. 1 is a partially sectioned front elevation of the present invention.

The details of the present invention will now be described on the basis of its embodiments shown in the drawings. A spinning reel casing 3, which consists of a body 1 and a cover 2, is provided at the rear portion thereof with an end-walled cylinder 4 which consists of lengthwise-divided complementary members 1', 2' formed integrally with and extended from the body 1 and cover 2. A bevelled rear end portion of a spool shaft 6, which is adapted to be moved slidingly and reciprocatingly in the axial direction in accordance with a turning movement of a handle in a known manner through a bore 5 in the body 1, is extended in the end-walled cylinder 4, and a drag braking member 7 is fitted to the flattened part of the shaft, which is in the end-walled cylinder 4, of the spool shaft 6.

As shown in the drawings of the embodiments, the drag braking member 7 is fitted in the through bore 5 in the body 1 so that the drag braking member 7 can be turned, and it consists of a brake member 8 mounted on the spool shaft 6 so that the brake member 8 can be moved slidingly in the axial direction only of the spool shaft 6, lining washers 9, 9 provided to abut on the front and rear side surfaces of the brake member 8, a brake member 11 fitted around an annular projection 8' on the rear side surface of the brake member 8 and engaged via projections 11' with an engaging groove 10 in the inner circumferential surface of the end-walled cylinder 4, and a spring 12 provided in contact with the rear portion of the brake member 11.

An operating cylinder 13 is supported in a through bore 14 in the end wall of the end-walled cylinder 4 so that the operating cylinder 13 covers the outer circumferential surface of the end-walled cylinder 4 and can be turned with respect thereto. A hollow rotatable member 16 having threads 15 on the outer circumferential surface thereof is set in the support portions of the end-walled cylinder 4 and operating cylinder 13 by a screw 17 so that the rotatable member 16 can be turned unitarily with the operating cylinder 13. A movable regulating member 18 abutting on the rear end of the spring 12 and engaged with the engaging groove 10 via projections 18' is meshed with the threads 15.

Figure 6:
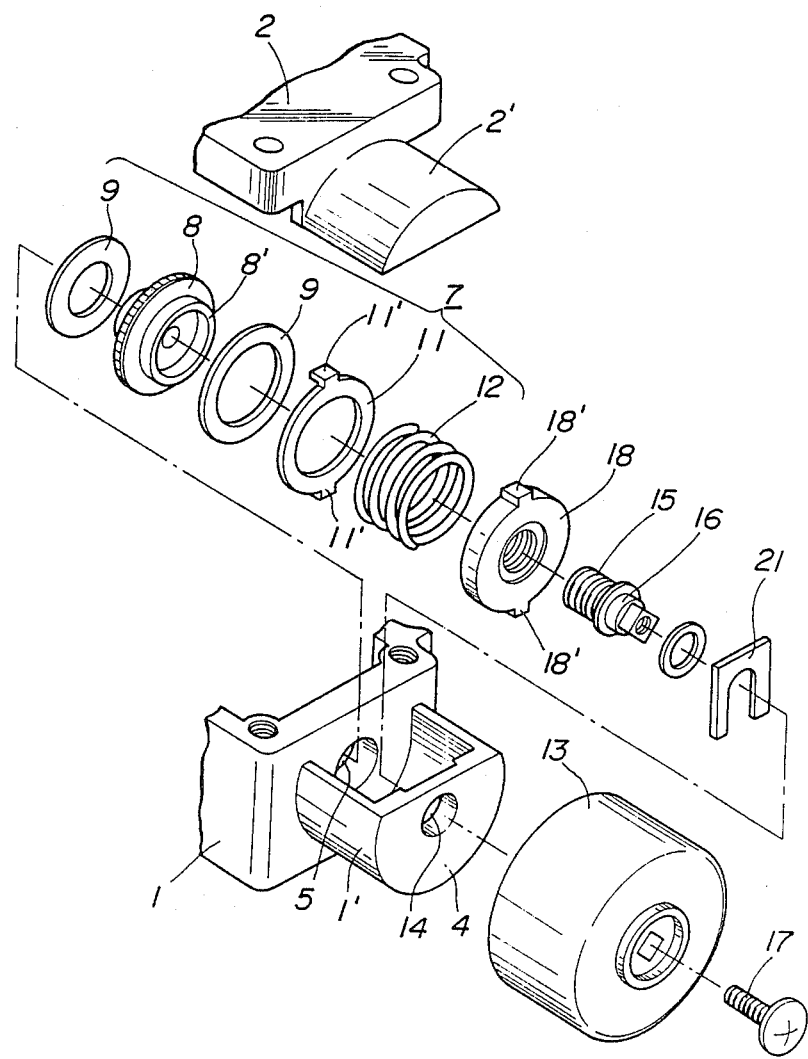
FIG. 6 is an exploded view in perspective of a principal portion of the present invention.

The operating cylinder 13 is provided in its inner circumferential surface with grooves 19 extending in the axial direction thereof, and a latching spring 20 fixed to the outer circumferential surface of the end-walled cylinder 4 is engaged with one of the grooves 19 so as to regulate the turning of the operating cylinder 13. Reference numeral 21 in FIG. 6 denotes a member for preventing the rotatable member 16 from slipping off.

This embodiment is constructed as described above. Accordingly, when the operating cylinder 13 is turned, the rotatable member 16 engaged unitarily therewith is turned to move the regulating member 18 in the axial direction and thereby regulating the degree of the pressure force of the drag braking member 7, so that the spool shaft 6 is braked with a larger or smaller force.

Figure 7:
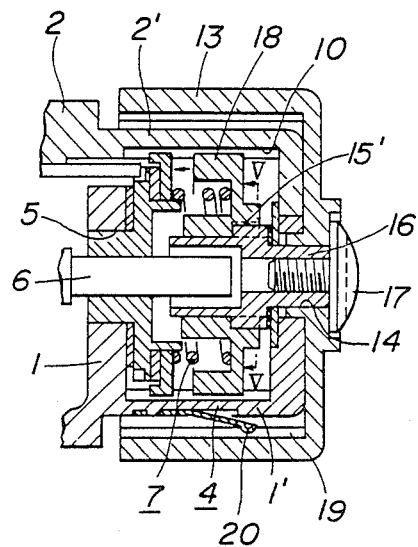
FIG. 7 is a sectioned front elevation of another embodiment.
Figure 8:
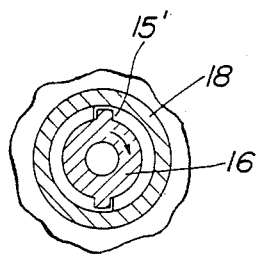
FIG. 8 is a sectional view taken along the line V—V in FIG. 7.
Figure 9:
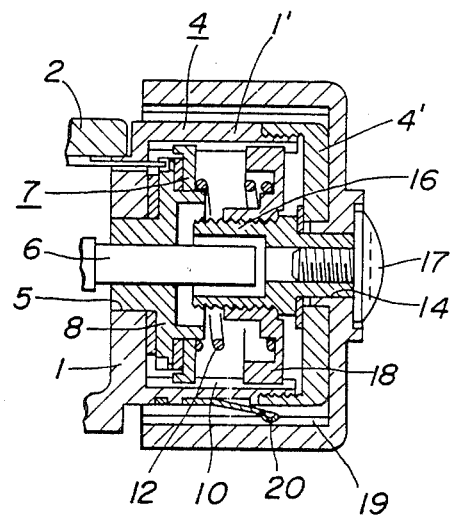
FIG. 9 is a sectioned front elevation of still another embodiment.

In an embodiment shown in FIGS. 7 and 8, a rotatable member 16 and a movable regulating member 18 are engaged with each other by a cam 15', which is provided on the movable regulating member 18, instead of a screw means, and the regulating member 18 is moved axially by utilizing the cam 15'. In an embodiment shown in FIG. 9, an end-walled cylinder 4 is not divided into complementary members extending from a body 1 and a cover 2, but it is formed of the body 1 alone, the rear end portion of the body 1 being formed by a cap 4' screwed to the body 1. The drag braking member 7 is not limited to those provided in the above described embodiments.

According to the present invention, a rotatable member is set in and unitarily connected with the central portion of an operating cylinder, which is capable of being turned on the outer side of an end-walled cylinder projected from a reel casing, and a drag braking member is urged by a movable regulating member which is engaged with the rotatable member so that the regulating member is axially moved. Therefore, a difference between the diameter of the operating cylinder and that of the engaged portions of the rotatable member and movable regulating member can be set to a higher level. This enables a drag braking operation to be carried out easily by a small tightening torque of the operating cylinder. Since the drag braking member is housed in the end-walled cylinder, the entry of extraneous matter, such as seawater and sand from the outside into the braking member, can be prevented reliably, and the turning action of the operating cylinder is not obstructed by anything. Moreover, since the operating cylinder itself does not move axially, the length of the portion of the reel casing which projects rearward can be minimized. This enables the reel casing to be miniaturized.

The present invention is not, of course, limited to the above embodiments; it may be modified in various ways within the scope of the appended claims.

What is claimed is:

1. A drag braking unit for a spool shaft in a fishing spinning reel, comprising
   a real casing having a rear portion,
   a rear-end walled cylinder projecting from said rear portion of said reel casing, having an inner circumferential surface with an axial engaging groove therein, and having an end-wall portion,
   a spool shaft supported on said rear portion of said reel casing so that said spool shaft can be turned and axially slid therein in an axial direction along said spool shaft, said spool shaft having a rear end portion extending into said cylinder,
   a drag braking member, for braking said spool shaft, fitted to a portion of said spool shaft which is in said cylinder,
   an operating cylinder supported rotatably at a supported portion thereof on said end-wall portion of said rear-end-walled cylinder and formed so as to surround an outer surface of said rear-end-walled cylinder,
   a rotatable member which is fitted in said supported portion of said operating cylinder and in said end-walled cylinder, said rotatable member being adapted to be turned unitarily with said supported portion of said operating cylinder, and
   a movable regulating member in said end-walled cylinder, which is engaged with said rotatable member so that said regulating member can be moved forward and backward in only said axial direction of said spool shaft, and which abuts on a rear portion of said drag braking member.

2. A drag braking unit for a spool shaft in a fishing spinning reel, comprising
   a reel casing having a rear portion,
   a rear-end-walled cylinder projecting from said rear portion of said reel casing, having an axial engaging groove in an inner circumferential surface thereof, and having an end-wall portion,
   a spool shaft supported on said rear portion of said reel casing so that said spool shaft can be turned and axially slid therein in an axial direction of said spool shaft, said spool shaft having a rear end portion thereof extending into said cylinder,
   a drag braking member, for braking said spool shaft, fitted to a portion of said spool shaft which is in said cylinder,
   an operating cylinder supported rotatably at a supported portion thereof on said end-wall portion of said rear-end-walled cylinder and formed so as to surround an outer surface of said rear-end-wall cylinder, said operating cylinder having an outer circumferential threaded surface,
   a rotatable member which is fitted in said supported portion of said operating cylinder and in said end-walled cylinder, said rotatable member being adapted to be turned unitarily with said supported portion of said operating cylinder, and having threads on an outer circumferential threaded surface thereof, and
   a movable regulating member which is screwed together with said outer circumferential threaded surface of said rotatable member and engaged with said axial engaging groove in said inner circumferential surface of said end-walled cylinder so as to be moved forward and backward only in said axial direction of said spool shaft, and which abuts on a rear portion of said drag braking member.

3. A drag braking unit for a spool shaft in a fishing spinning reel, comprising
   a reel casing having a rear portion,
   a rear-end walled cylinder projecting from said rear portion of a reel casing, having an axial engaging groove in an inner circumferential surface thereof, and having an end-wall portion,
   a spool shaft supported on said rear portion of said reel casing so that said spool shaft can be turned and axially slid thereon in an axial direction, said spool shaft having a rear end portion thereof extending into said cylinder,
   a drag braking member, for braking said spool shaft, fitted to a portion of said spool shaft which is in said cylinder,
   an operating cylinder supported rotatably at a supported portion thereof on said end-wall portion of said rear-end-walled cylinder and formed so as to surround an outer surface of said rear end-walled cylinder,
   a rotatable member which is fitted in said supported portion of said operating cylinder and in said end-walled cylinder, said rotatable member being adapted to be turned unitarily with said supported portion of said operating cylinder, and having a cam thereon, and
   a movable regulating member, which is engaged with said cam on said rotatable member and said axial engaging groove in the inner circumferential surface of said end-walled cylinder so as to be moved forward and backward only in an axial direction of said spool shaft, and which abuts on a rear portion of said drag braking member.

4. A fishing spinning reel according to claim 2, comprising
   said rear-end-walled cylinder having a cylinder body, and
   screw means for detachably screwing the end-walled portion of said rear-end-walled cylinder with said cylinder body thereof.

* * * * *